(12) United States Patent
Bonner, Jr. et al.

(10) Patent No.: US 9,030,148 B2
(45) Date of Patent: May 12, 2015

(54) SYSTEMS AND METHODS FOR CONTROLLING ELECTRIC MOTORS

(71) Applicant: Regal Beloit America, Inc., Beloit, WI (US)

(72) Inventors: Guy Bonner, Jr., Markle, IN (US); Scott A. Coonrod, Machesney Park, IL (US); Gregory P. Sullivan, Fort Wayne, IN (US); Harry Robert Wilson, Auburn, IN (US)

(73) Assignee: Regal Beloit America, Inc., Beloit, WI (US)

( * ) Notice: Subject to any disclaimer, the term of this patent is extended or adjusted under 35 U.S.C. 154(b) by 196 days.

(21) Appl. No.: 13/804,352

(22) Filed: Mar. 14, 2013

(65) Prior Publication Data

US 2014/0265985 A1   Sep. 18, 2014

(51) Int. Cl.
*G05B 11/32* (2006.01)
*H02P 5/00* (2006.01)
*H02P 29/00* (2006.01)

(52) U.S. Cl.
CPC .............. *H02P 5/00* (2013.01); *H02P 29/0005* (2013.01)

(58) Field of Classification Search
CPC .. H02P 21/0089; H02P 21/0035; G05B 19/19
USPC ........ 318/625, 494, 400.02, 67, 34, 800, 432, 318/433, 286, 379, 400.09, 85
See application file for complete search history.

(56) References Cited

U.S. PATENT DOCUMENTS

| | | | |
|---|---|---|---|
| 4,574,566 A * | 3/1986 | Eaves et al. ..................... | 53/450 |
| 5,233,278 A * | 8/1993 | Carter ........................... | 318/551 |
| 6,792,766 B2 | 9/2004 | Osborne et al. | |
| 2009/0143918 A1 | 6/2009 | Amundson et al. | |
| 2010/0070089 A1 | 3/2010 | Harrod et al. | |
| 2010/0320949 A1 | 12/2010 | Fotherby | |
| 2011/0057585 A1* | 3/2011 | Zhou .............................. | 318/67 |
| 2011/0062903 A1* | 3/2011 | Li et al. .................... | 318/400.02 |
| 2012/0310418 A1 | 12/2012 | Harrod et al. | |

* cited by examiner

*Primary Examiner* — Karen Masih
(74) *Attorney, Agent, or Firm* — Armstrong Teasdale LLP

(57) ABSTRACT

An electronic control module is provided. The electronic control module includes an input device, and a processor coupled to the input device. The processor is configured to generate a command signal in response to an input supplied by the input device, and transmit the command signal to a plurality of motors, wherein the command signal controls an operating point of each of the plurality of motors.

19 Claims, 3 Drawing Sheets

US 9,030,148 B2

SYSTEMS AND METHODS FOR CONTROLLING ELECTRIC MOTORS

BACKGROUND OF THE DISCLOSURE

The field of the invention relates generally to electric motors, and more specifically, to controlling a plurality of electric motors using an electronic control module.

Electric motors are used in a variety of systems operating in a variety of industries. For example, electric motors are used to power products such as fans used in heating, ventilation and air conditioning systems (HVAC). At least some known systems include a plurality of motors each operating at a respective operating point.

In at least some known systems including a plurality of motors, each motor includes its own onboard controller. That is, each motor is controlled independent of other motors in the system. Accordingly, to change the operating point of multiple motors in at least some known systems, each motor must be separately reprogrammed. Further, with each motor controlled independently, it may be relatively difficult to operate each motor at the same operating point. Moreover, motors with sophisticated onboard controllers may be relatively expensive, and systems including multiple motors may require different models of motors for separate applications, further increasing costs associated with such systems.

BRIEF DESCRIPTION

In one aspect, an electronic control module is provided. The electronic control module includes an input device, and a processor coupled to the input device. The processor is configured to generate a command signal in response to an input supplied by the input device, and transmit the command signal to a plurality of motors, wherein the command signal controls an operating point of each of the plurality of motors.

In another aspect, a motor control system is provided. The motor control system includes a plurality of motors, and an electronic control module coupled to the plurality of motors, the electronic control module including an input device, and a processor coupled to the input device. The processor is configured to generate a command signal in response to an input supplied by said input device, and transmit the command signal to the plurality of motors, wherein the command signal controls an operating point of each of the plurality of motors.

In yet another aspect, a method for controlling a plurality of motors is provided. The method includes receiving an input at an electronic control module, generating, using the electronic control module, a command signal in response to the input, and transmitting the command signal to a plurality of motors coupled to the electronic control module. The method further includes determining, from the command signal, a corresponding operating point for each motor, and operating each of the plurality of motors at the respective operating point.

DETAILED DESCRIPTION

The methods and systems described herein facilitate controlling a plurality of motors using an electronic control module. As described herein, the electronic control module transmits a command signal to each of a plurality of motors, and the command signal controls an operating point of each motor. Accordingly, by adjusting the command signal, the operating points for each of the plurality of motors can be adjusted simultaneously.

Technical effects of the methods and systems described herein include at least one of: (a) receiving an input; (b) generating a command signal in response to the input; (c) transmitting the command signal to a plurality of motors; (d) determining, from the command signal, a corresponding operating point for each motor; and (e) operating each of the plurality of motors at the respective operating point.

Figure 1:
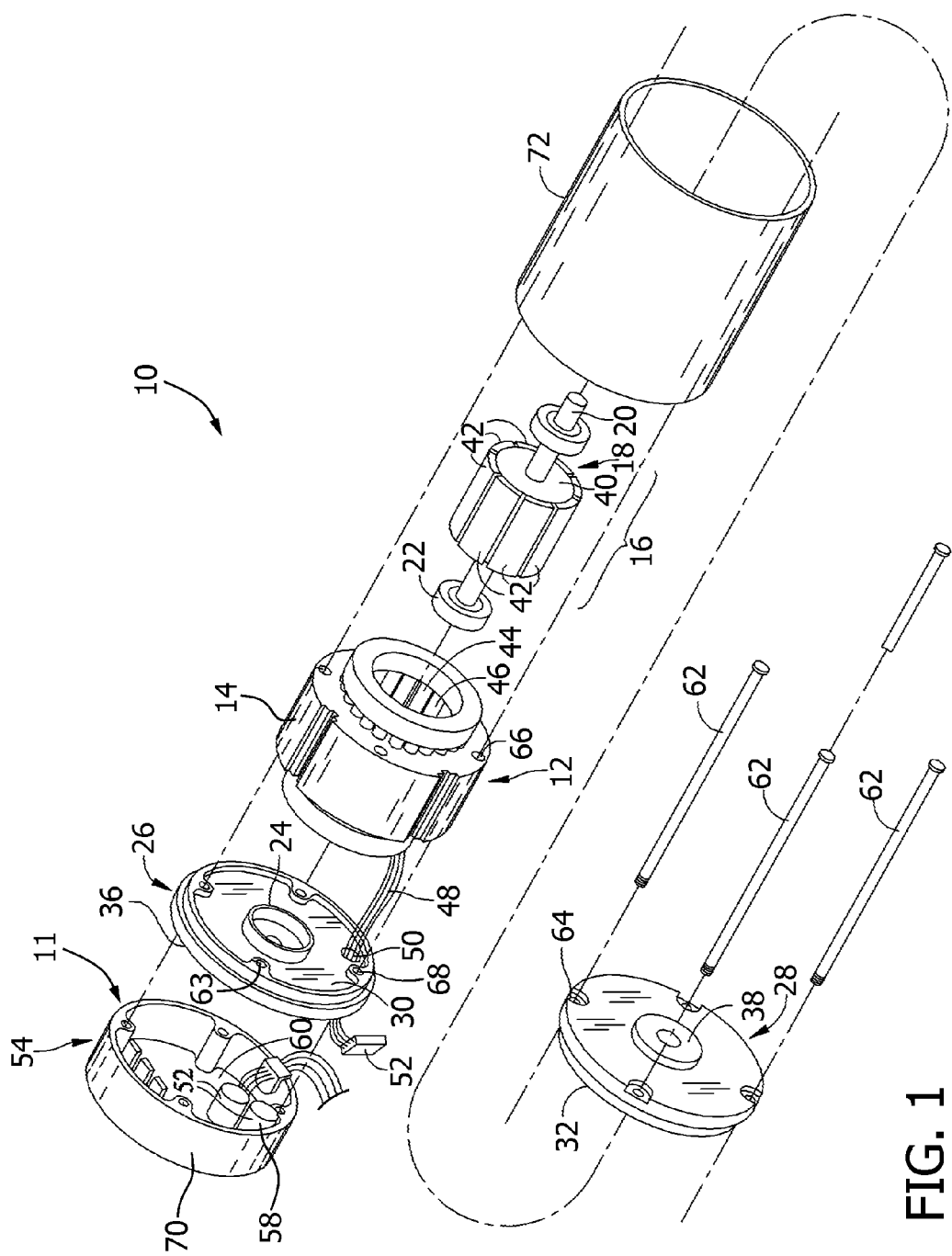
FIG. 1 is an exploded view of an exemplary electric motor.

FIG. 1 is an exploded view of an exemplary motor 10. Motor 10 includes control system 11, a stationary assembly 12 including a stator or core 14, and a rotatable assembly 16 including a permanent magnet rotor 18 and a shaft 20. In the exemplary embodiment, motor 10 is used in a heating, ventilating and air conditioning system (not shown), and control system 11 is integrated with motor 10. Alternatively, motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 further includes an enclosure 54 which mounts on the rear portion of motor 10. Control system 11 includes a plurality of electronic components 58 and a connector (not shown in FIG. 1) mounted on a component board 60, such as a printed circuit board. Control system 11 is connected to winding stages 44 by interconnecting connector 52. Control system 11 applies a voltage to one or more of winding stages 44 at a time for commutating winding stages 44 in a preselected sequence to rotate rotatable assembly 16 about an axis of rotation.

Connecting elements 62 include a plurality of bolts that pass through bolt holes 64 in second end member 28, bolt holes 66 in core 14, bolt holes 68 in first end member 26, and bolt holes 70 in enclosure 44. Connecting elements 62 are adapted to urge second end member 28 and enclosure 44 toward each other thereby supporting first end member 26, stationary assembly 12, and rotatable assembly 16 therebetween. Additionally, a housing 72 is positioned between first end member 26 and second end member 28 to facilitate enclosing and protecting stationary assembly 12 and rotatable assembly 16.

Motor 10 may include any even number of rotor poles and the number of stator poles are a multiple of the number of rotor poles. For example, the number of stator poles may be based on the number of phases. In one embodiment (not shown), a three-phase motor 10 includes six rotor pole pairs and stator poles.

Figure 2:
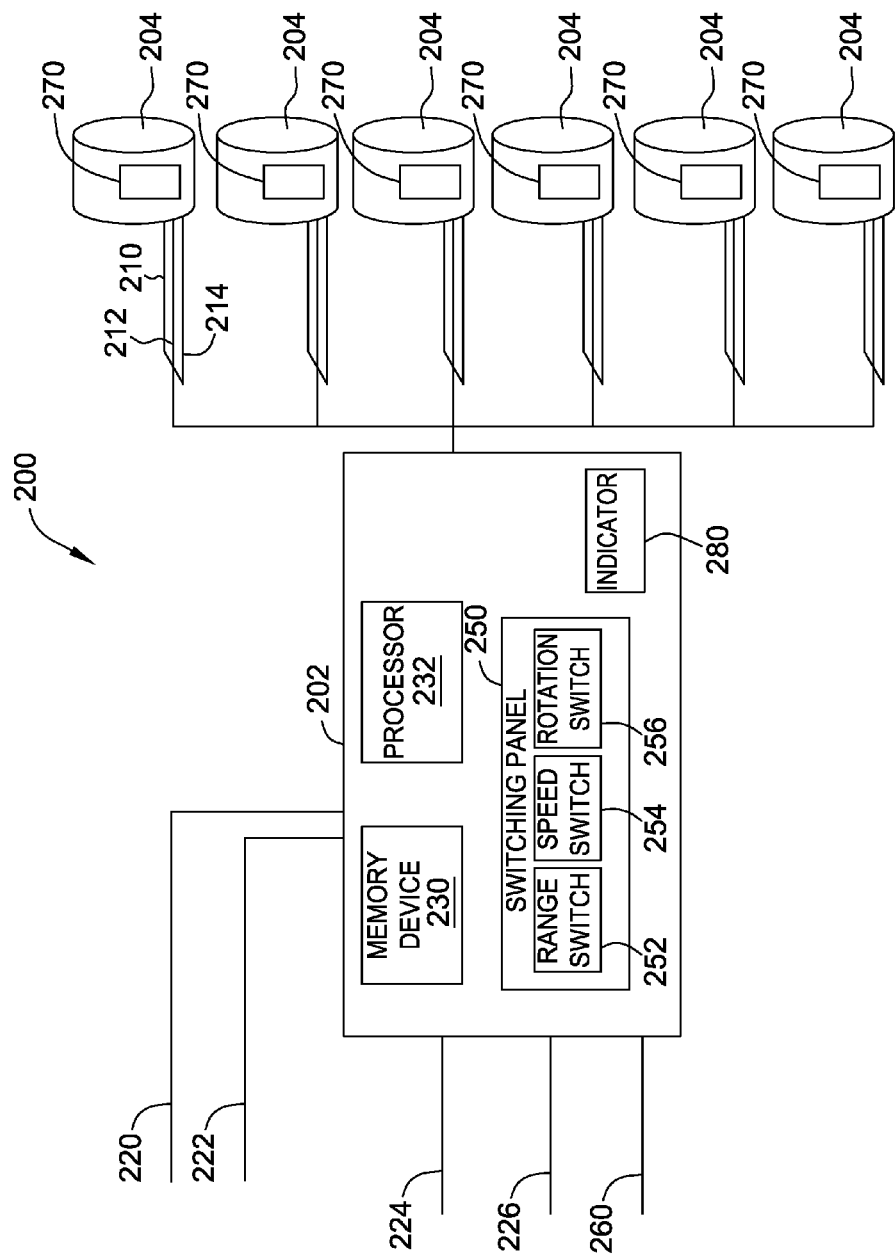
FIG. 2 is a schematic diagram of an exemplary motor control system that may be used with electric motor shown in FIG. 1.

FIG. 2 is a schematic diagram of an exemplary motor control system 200 that includes an electronic control module 202 that controls a plurality of motors 204, such as motor 10 (shown in FIG. 1). In the exemplary embodiment, six motors 204 are controlled by electronic control module 202. Alternatively, electronic control module 202 may control any number of motors 204 that enables motor control system 200 to function as described herein.

Each motor 204 is connected to electronic control module 202 via a first lead 210, a second lead 212, and a third lead 214 in the exemplary embodiment. First and second leads 210 and 212 are line voltage inputs, and third lead 214 is a high-voltage command lead, as described in detail herein. In the exemplary embodiment, motors 204 are utilized as fan and/or blower motors in a fluid (e.g., water, air, etc.) moving system. For example, motors 204 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motors 204 may be implemented in any application that enables electric motor control system 200 to function as described herein. Motors 204 may also be used to drive mechanical components other than a fan and/or blower, including mixers, gears, conveyors, and/or treadmills.

Electronic control module 202 receives a line voltage from first and second line voltage inputs 220 and 222. The line voltage may be, for example, 115 Volts at a frequency of 50 Hz or 60 Hz, or 208-230 Volts at 50 Hz or 60 Hz. The line voltage from first and second line voltage inputs 220 and 222 is provided to each motor 204 through first and second leads 210 and 212.

In the exemplary embodiment, electronic control module 202 is powered by a 24 Volt direct current input 224 and a circuit common input 226. Alternatively, electronic control module 202 may operate using the alternating current line voltage supplied by first and second line voltage inputs 220 and 222.

Electronic control module 202 controls motors 204 by transmitting a command signal to each motor 204 through third lead 214. The same command signal is provided to each motor 204 simultaneously by electronic control module 202. In the exemplary embodiment, command signal is one or more high-voltage pulses transmitted at the line voltage frequency. Motors 204 receive the command signal and determine a corresponding operating point, as described in detail herein.

Electronic control module 202 includes at least one memory device 230 and a processor 232 that is communicatively coupled to memory device 230 for executing instructions. In some embodiments, executable instructions are stored in memory device 230. In the exemplary embodiment, electronic control module 202 performs one or more operations described herein by programming processor 232. For example, processor 232 may be programmed by encoding an operation as one or more executable instructions and by providing the executable instructions in memory device 230.

Processor 232 may include one or more processing units (e.g., in a multi-core configuration). Further, processor 232 may be implemented using one or more heterogeneous processor systems in which a main processor is present with secondary processors on a single chip. As another illustrative example, processor 232 may be a symmetric multi-processor system containing multiple processors of the same type. Further, processor 232 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 232 controls operation of electronic control module 202.

In the exemplary embodiment, memory device 230 is one or more devices that enable information such as executable instructions and/or other data to be stored and retrieved. Memory device 230 may include one or more computer readable media, such as, without limitation, dynamic random access memory (DRAM), static random access memory (SRAM), a solid state disk, and/or a hard disk. Memory device 230 may be configured to store, without limitation, application source code, application object code, source code portions of interest, object code portions of interest, configuration data, execution events and/or any other type of data. In the exemplary embodiment, memory device 230 includes firmware and/or initial configuration data for electronic control module 202.

To control the command signal sent to motors 204, electronic control module 202 includes a switching panel 250 coupled to processor 232 that enables a user to select the operating point for motors 204. As used herein, an operating point for a motor 204 includes at least a speed and a rotation direction. In the exemplary embodiment, to specify the operating point, switching panel 250 includes a range switch 252, a speed switch 254, and a rotation switch 256. Alternatively, switching panel 250 may include any switches and/or controls that enable motor control system 200 to function as described herein.

In the exemplary embodiment, range switch 252 selects a range of speeds, and speed switch 254 specifies a discrete speed within the selected range. In one example, range switch 252 selects one of eight 400 revolution per minute (RPM) ranges, and speed switch 254 selects one of sixteen speeds within the selected 400 RPM range. Table 1 shows the selectable speeds in this example, where range switch 252 has eight settings and speed switch 254 has sixteen settings. Alternatively, range switch 252 and speed switch 254 may be set to select any ranges and/or speeds that enable motor control system 200 to function as described herein.

TABLE 1

| Speed Switch Setting | Range Switch Setting | 1 | 2 | 3 Selected | 4 Speeds | 5 (RPM) | 6 | 7 | 8 |
|---|---|---|---|---|---|---|---|---|---|
| 0 | | 500 | 900 | 1300 | 1700 | 2100 | 2500 | 2900 | 3300 |
| 1 | | 525 | 925 | 1325 | 1725 | 2125 | 2525 | 2925 | 3325 |
| 2 | | 550 | 950 | 1350 | 1750 | 2150 | 2550 | 2950 | 3350 |
| 3 | | 575 | 975 | 1375 | 1775 | 2175 | 2575 | 2975 | 3375 |
| 4 | | 600 | 1000 | 1400 | 1800 | 2200 | 2600 | 3000 | 3400 |
| 5 | | 625 | 1025 | 1425 | 1825 | 2225 | 2625 | 3025 | 3425 |
| 6 | | 650 | 1050 | 1450 | 1850 | 2250 | 2650 | 3050 | 3450 |
| 7 | | 675 | 1075 | 1475 | 1875 | 2275 | 2675 | 3075 | 3475 |
| 8 | | 700 | 1100 | 1500 | 1900 | 2300 | 2700 | 3100 | 3500 |
| 9 | | 725 | 1125 | 1525 | 1925 | 2325 | 2725 | 3125 | 3525 |
| A | | 750 | 1150 | 1550 | 1950 | 2350 | 2750 | 3150 | 3550 |
| B | | 775 | 1175 | 1575 | 1975 | 2375 | 2775 | 3175 | 3575 |
| C | | 800 | 1200 | 1600 | 2000 | 2400 | 2800 | 3200 | 3600 |
| D | | 825 | 1225 | 1625 | 2025 | 2425 | 2825 | 3225 | 3625 |
| E | | 850 | 1250 | 1650 | 2050 | 2450 | 2850 | 3250 | 3650 |
| F | | 875 | 1275 | 1675 | 2075 | 2475 | 2875 | 3275 | 3675 |

Range switch 252 is set using a 0-24 VDC analog control input 260 in the exemplary embodiment. That is, different input voltage ranges correspond to different settings (e.g., 0.0-3.0 Volts is setting "1", 3.1-6.0 Volts is setting "2", etc.). In the exemplary embodiment, speed switch 254 is a sixteen-setting hexadecimal switch, and each setting specifies a discrete speed. Alternatively, range switch 252 and/or speed switch 254 may be any switching devices that enable motor control system 200 to function as described herein.

Rotation switch 256 selects a rotation direction (i.e., clockwise or counterclockwise) for motors 204. In the exemplary embodiment, rotation switch 256 is a two-setting toggle switch. Alternatively, rotation switch 256 may be any switching device that enables motor control system 200 to function as described herein.

In the exemplary embodiment, an operating point is set by the combined settings of range switch 252, speed switch 254, and rotation switch 256. Alternatively, other control schemes may be used. For example, in one embodiment, the operating point may be set solely by analog control input 260, where an input voltage range correlates to both a speed and rotation direction. In another embodiment, the operating point may be set solely using a hexadecimal switch, with each setting correlating to both a speed and rotation direction. In yet another embodiment, the operating point may be set in response to a signal received from a sensor device (e.g., a temperature sensor, a pressure sensor, etc.). As will be appreciated by those of skill in the art, a variety of control schemes may be used to select an operating point.

In response to the settings specified on switching panel 250, processor 232 generates and transmits the corresponding command signal to motors 204 via third leads 214. Each motor 204 receives the command signal and determines the corresponding operating point. In the exemplary embodiment, each motor 204 includes a look-up table 270 stored on a memory device similar to memory device 230. Look-up table 270 lists a plurality of predetermined operating points and the number of high-voltage pulses in a predetermined command signal corresponding to each operating point. Accordingly, using a processing device similar to processor 232, each motor 204 receives the command signal, counts the number of high-voltage pulses in the command signal, and determines a corresponding operating point using look-up table 270. Using the processing device or another control device, each motor 204 operates at the determined operating point.

In the exemplary embodiment, each motor 204 has an identical look-up table 270. That is, in response to receiving the command signal, each motor 204 will operate at the same operating point. Alternatively, different motors 204 may have look-up tables 270 with different values. Accordingly, although all motors 204 receiving the same command signal, the motors 204 may operate at different operating points. In the exemplary embodiment, look-up tables 270 also specify a default operating point. More specifically, when no command signal is received from electronic control module 202, motors 204 operate at the default operating point. Motors 204 may have the same or different default operating points.

Electronic control module 202 includes an indicator 280 in the exemplary embodiment. Indicator 280 indicates whether a command signal is being transmitted to motors 204. Indicator 280 may include any audio and/or visual device that provides an indication, such as, for example, a speaker, a light emitting diode (LED), etc.

Figure 3:
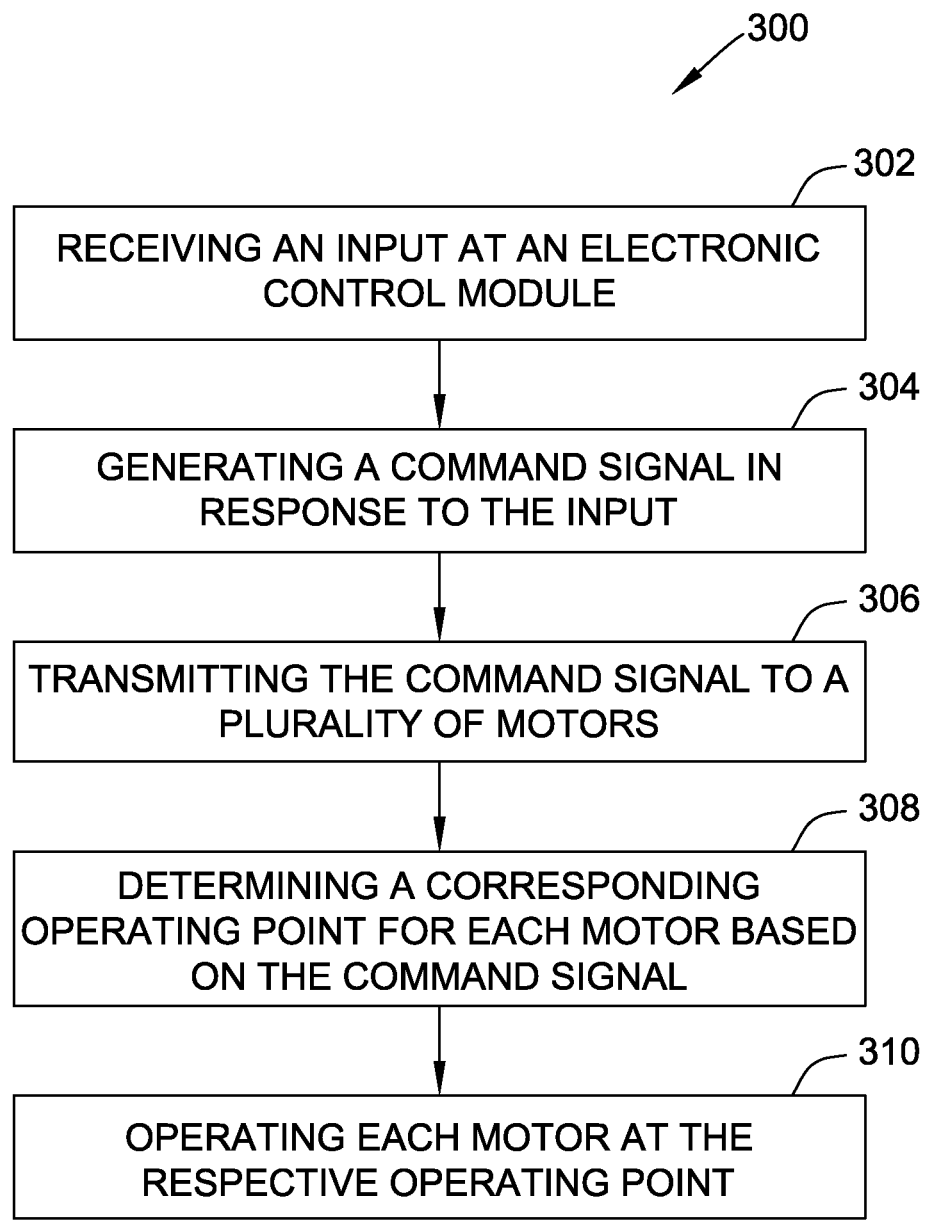
FIG. 3 is a flow chart of an exemplary method for controlling a plurality of motors that may be used with the motor control system shown in FIG. 2.

FIG. 3 is a flow chart of an exemplary method 300 for controlling a plurality of motors. An input is received 302 at an electronic control module, such as electronic control module 202 (shown in FIG. 2). The input may be, for example, a setting from a switch, such as switches 252, 254, and 256 (shown in FIG. 2). In response to the input, the electronic control module generates 304 a command signal. In the exemplary embodiment, the command signal is one or more high-voltage pulses.

The command signal is transmitted 306 to a plurality of motors coupled to the electronic control module, such as motors 204 (shown in FIG. 2). Based on the received command signal, each motor determines 308 a corresponding operating point. The operating point may be determined 308 using a look-up table, such as look-up tables 270 (shown in FIG. 2). In the exemplary embodiment, the operating point defines a speed and a direction of rotation for the motor. Using a processor or other control device, each motor is operated 310 at the respective operating point determined for that motor.

As compared to at least some known electric motor systems, the methods and systems described herein utilize a single electronic control module to simultaneously control a plurality of motors. Accordingly, an operating point of each of the plurality of motors can be adjusted by changing a command signal transmitted from the electronic control module. In contrast, in at least some known electric motor systems, each motor must be independently reprogrammed to adjust its operating point. Moreover, using the methods and systems described herein, the plurality of motors can all be set to operate at the same operating point. Further, as compared to at least some known electric motor systems, the electronic control module provides a configurable interface that facilitates adjustment of the command signal. Finally, if a motor in the systems described herein fails, a replacement motor can be swapped in relatively quickly and easily.

The systems and methods described herein facilitate efficient and economical manufacture and operation of an electric motor system. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic control module comprising:
an input device; and
a processor coupled to said input device, said processor configured to:
generate a command signal in response to an input supplied by said input device; and
transmit the command signal to a plurality of motors, wherein the command signal controls a speed and a rotation direction of each of the plurality of motors.

2. An electronic control module in accordance with claim 1, wherein said input device comprises a range switch, a speed switch, and a rotation switch.

3. An electronic control module in accordance with claim 2, wherein said range switch is controlled using an analog control input.

4. An electronic control module in accordance with claim 2, wherein said speed switch comprises a hexadecimal switch.

5. An electronic control module in accordance with claim 1, wherein the command signal includes at least one high-voltage pulse.

6. An electronic control module in accordance with claim 1, further comprising an indicator configured to indicate whether the command signal is being transmitted to the plurality of motors.

7. An electronic control module in accordance with claim 1, wherein said electronic control module is configured to provide a line voltage to the plurality of motors.

8. A motor control system comprising:
a plurality of motors; and
an electronic control module coupled to said plurality of motors, said electronic control module comprising:
an input device; and
a processor coupled to said input device, said processor configured to:
generate a command signal in response to an input supplied by said input device; and
transmit the command signal to said plurality of motors, wherein the command signal controls a speed and a rotation direction of each of said plurality of motors.

9. A motor control system in accordance with claim 8, wherein each of said plurality of motors is coupled to said electronic control module through a first lead, a second lead, and a third lead.

10. A motor control system in accordance with claim 9, wherein said first and second leads are configured to receive a line voltage, and said third lead is configured to receive the command signal.

11. A motor control system in accordance with claim 8, wherein each of said plurality of motors is configured to:
receive the command signal;
determine the speed and the rotation direction that corresponds to the command and signal; and
operate at the determined speed and the rotation direction.

12. A motor control system in accordance with claim 11, wherein each of said plurality of motors comprises a look-up table that includes a plurality of predetermined operating points and a predetermined command signal associated with each of the plurality of predetermined operating points, each of said plurality of motors configured to use said look-up table to determine the operating point that corresponds to the command signal, wherein each of the plurality of predetermined operating points includes a predetermined speed and a predetermined rotation direction.

13. A motor control system in accordance with claim 8, wherein said input device comprises a range switch, a speed switch, and a rotation switch.

14. A motor control system in accordance with claim 8, wherein the command signal includes at least one high-voltage pulse.

15. A method for controlling a plurality of motors, said method comprising:
receiving an input at an electronic control module;
generating, using the electronic control module, a command signal in response to the input;
transmitting the command signal to a plurality of motors coupled to the electronic control module;
determining, from the command signal, a corresponding operating point for each motor, wherein the corresponding operating point includes a speed and a rotation direction; and
operating each of the plurality of motors at the respective operating point.

16. A method in accordance with claim 15, wherein receiving an input comprises receiving an input from at least one of a range switch, a speed switch, and a rotation switch.

17. A method in accordance with claim 15, wherein transmitting a command signal comprises transmitting at least one high-voltage pulse to the plurality of motors.

18. A method in accordance with claim 15, wherein determining a corresponding operating point comprises determining a corresponding operating point using a look-up table stored on each of the plurality of motors, the look-up table including a plurality of predetermined operating points and a predetermined command signal associated with each of the plurality of predetermined operating points.

19. A method in accordance with claim 15, further comprising activating an indicator on the electronic control module when the command signal is transmitted to the plurality of motors.

\* \* \* \* \*